United States Patent
Fujita et al.

(10) Patent No.: US 8,712,644 B2
(45) Date of Patent: Apr. 29, 2014

(54) VEHICLE CONTROL APPARATUS

(75) Inventors: Yoshitaka Fujita, Susono (JP); Mitsutaka Tanimoto, Susono (JP); Go Inoue, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 85 days.

(21) Appl. No.: 13/497,004

(22) PCT Filed: Jan. 19, 2011

(86) PCT No.: PCT/JP2011/050859
§ 371 (c)(1),
(2), (4) Date: Mar. 19, 2012

(87) PCT Pub. No.: WO2012/098654
PCT Pub. Date: Jul. 26, 2012

(65) Prior Publication Data
US 2012/0253602 A1    Oct. 4, 2012

(51) Int. Cl.
*A01B 69/00*    (2006.01)
(52) U.S. Cl.
USPC .......................................... 701/41; 303/113.2
(58) Field of Classification Search
USPC .......... 701/41–44, 72, 73; 180/446, 402–403, 180/421–423
See application file for complete search history.

(56) References Cited

U.S. PATENT DOCUMENTS

| 4,831,532 | A   | 5/1989 | Kondo |
| 5,089,967 | A   | 2/1992 | Haseda et al. |
| 7,035,726 | B2 * | 4/2006 | Sakata ............................ 701/72 |
| 7,374,014 | B2 * | 5/2008 | Yasui et al. ................... 180/446 |

FOREIGN PATENT DOCUMENTS

| JP | 62 253557   | 11/1987 |
| JP | 1 132472    | 5/1989  |
| JP | 1 244953    | 9/1989  |
| JP | 9 249111    | 9/1997  |
| JP | 2000 229563 | 8/2000  |
| JP | 2005 145358 | 6/2005  |

* cited by examiner

*Primary Examiner* — Thomas Black
*Assistant Examiner* — Luke Huynh
(74) *Attorney, Agent, or Firm* — Oblon, Spivak, McClelland, Maier & Neustadt, L.L.P.

(57) ABSTRACT

A vehicle control apparatus including a braking force applying device of a hydraulic type, capable of applying a braking force to each of a plurality of wheels. A hydraulic pressure controlling device controls a hydraulic pressure of the braking force applying device such that each of the wheels is not locked. A hydraulic pressure increasing or decreasing period changing device changes an increasing or decreasing period of the hydraulic pressure controlled by the hydraulic pressure controlling device. A controlling device controls the hydraulic pressure increasing or decreasing period changing device to change the increasing or decreasing period of the hydraulic pressure corresponding to each of the wheels in contact with a road surface having a high road surface friction coefficient, from that where a left-right braking force difference is not generated, to where the left-right braking force difference is generated by the hydraulic pressure controlling device.

8 Claims, 3 Drawing Sheets

Low μ road surface    High μ road surface

VEHICLE CONTROL APPARATUS

TECHNICAL FIELD

The present invention relates to a vehicle control apparatus for controlling a braking force.

BACKGROUND ART

As this type of apparatus, for example, there has been suggested an apparatus for preventing an excessive braking force difference between left and right wheels and suppressing a yaw torque applied to a vehicle by limiting an increase in brake hydraulic pressure of a wheel on the side of a high hydraulic pressure while the vehicle is driving on a split road (refer to a patent document 1).

Alternatively, there has been suggested an apparatus for reducing a climb gradient of a brake pressure of one of rear wheels having a higher braking friction coefficient, in comparison with that in the normal case, at least in a first control cycle period when control of the brake pressure of each of the rear wheels of the vehicle is changed to independent control due to the detection of the split road (refer to a patent document 2).

Alternatively, there has been suggested an apparatus for periodically controlling the operation of a fluid pressure control valve device with a control period obtained by multiplying a first coefficient of 1 or less by a second coefficient of 1 or less, in a basic control period determined on the basis of a friction coefficient of a driving road surface, wherein the first coefficient becomes smaller in accordance with a reduction in an estimated vehicle body speed at the start of antilock braking control, and the second coefficient becomes smaller in accordance with a reduction in the estimated vehicle body speed during the antilock braking control (refer to a patent document 3).

PRIOR ART DOCUMENT

Patent Document

Patent document 1: Japanese Patent Application Laid Open No. Hei 9-249111
Patent document 2: Japanese Patent Application Laid Open No. Hei 1-244953
Patent document 3: Japanese Patent Application Laid Open No. Hei 2000-229563

DISCLOSURE OF INVENTION

Subject to be Solved by the Invention

However, according to the aforementioned background art, there is such a technical problem that it is not sufficient to reduce a deviation in a yaw direction of the vehicle and to improve a braking performance.

In view of the aforementioned problem, it is therefore an object of the present invention to provide a vehicle control apparatus capable of preferably improving a braking capability while suppressing the deviation in the yaw direction of the vehicle.

Means for Solving the Subject

The above object of the present invention can be achieved by a vehicle control apparatus provided with: braking force applying device of a hydraulic type, capable of applying a braking force to each of wheels; a hydraulic pressure controlling device capable of controlling a hydraulic pressure of the braking force applying device such that each of the wheels is not locked; a hydraulic pressure increasing or decreasing period changing device capable of changing an increasing or decreasing period of the hydraulic pressure controlled by the hydraulic pressure controlling device; and a controlling device for controlling the hydraulic pressure increasing or decreasing period changing device so as to change the increasing or decreasing period of the hydraulic pressure corresponding to each of the wheels in contact with a road surface having a high road surface friction coefficient, from that in a case where a left-right braking force difference is not generated, in a case where the left-right braking force difference is generated by the hydraulic pressure controlling device.

According to the vehicle control apparatus of the present invention, the braking force applying device of the hydraulic type can apply the braking force to each of the plurality of wheels provided for a vehicle. Incidentally, each of the braking force applying devices can adjust the magnitude of the braking force applied to respective one of the plurality of wheels individually.

The hydraulic pressure controlling device which is provided, for example, with a memory, a processor, and the like can control the hydraulic pressure of the braking force applying device such that each of the plurality of wheels is not locked. Specifically, for example, if deceleration of one wheel exceeds a predetermined value, the hydraulic pressure controlling device reduces the hydraulic pressure corresponding to the one wheel such that the one wheel is not locked.

The hydraulic pressure increasing or decreasing period changing device which is provided, for example, with a memory, a processor, and the like can change the increasing or decreasing period of the hydraulic pressure of the braking force applying device caused by the hydraulic pressure controlling device. The hydraulic pressure controlling device increases or reduces the hydraulic pressure corresponding to one wheel, periodically (e.g. every several milliseconds), in accordance with the deceleration of the one wheel. Thus, the hydraulic pressure of the braking force applying device increases or decreases, periodically. The hydraulic pressure increasing or decreasing period changing device changes the increasing or decreasing period, for example, by changing the aforementioned predetermined value (i.e. the deceleration of one wheel when the hydraulic pressure controlling device starts to reduce the hydraulic pressure corresponding to the one wheel such that the one wheel is not locked).

The controlling device which is provided, for example, with a memory, a processor, and the like controls the hydraulic pressure increasing or decreasing period changing device so as to change the increasing or decreasing period of the hydraulic pressure corresponding to each of the wheels in contact with the road surface having the high road surface friction coefficient, from that in the case where the left-right braking force difference is not generated, in the case where the left-right braking force difference is generated due to operation of the hydraulic pressure controlling device.

If the vehicle is driving on the split road, each of the wheels in contact with a road surface on the side of a low friction coefficient (i.e. a road surface having a low road surface friction coefficient) (hereinafter referred to as a "low µ road" as occasion demands) on the split road is locked more easily than each of the wheels in contact with a road surface on the side of a high friction coefficient (i.e. the road surface having the high road surface friction coefficient) (hereinafter referred to as a "high µ road" as occasion demands) on the split road.

Thus, the hydraulic pressure corresponding to each of the wheels in contact with the low μ road is reduced below the hydraulic pressure corresponding to each of the wheels in contact with the high μ road by the hydraulic pressure controlling device. As a result, a difference is generated between the braking force generated in each of the wheels in contact with the low μ road and the braking force generated in each of the wheels in contact with the high μ road (i.e. the left-right braking force difference is generated).

Then, yaw moment is generated in the vehicle due to the left-right braking force difference, and vehicle behavior likely becomes unstable. In response, there is suggested a technology of canceling the yaw moment due to the left-right braking force difference by means of a so-called active steering (i.e. a mechanism capable of changing a rudder angle of steered wheels independently of steering by a driver for promoting a change in the rudder angle). However, if the increasing or decreasing period of the hydraulic pressure associated with each of the braking force applying devices corresponds to a period corresponding to a yaw resonance frequency associated with the vehicle, oscillation in the yaw direction is amplified and the vehicle behavior likely becomes unstable, which is found by a study by the present inventors.

Thus, in the present invention, if the left-right braking force difference is generated due to operation of the hydraulic pressure controlling device, the hydraulic pressure increasing or decreasing period changing device is controlled by the controlling device so as to change the increasing or decreasing period of the hydraulic pressure corresponding to each of the wheels in contact with the high μ road, from that in the case where the left-right braking force difference is not generated.

Thus, according to the present invention, since the oscillation in the yaw direction can be suppressed, if the so-called active steering is controlled, the yaw moment due to the left-right braking force difference can be preferably suppressed. In addition, in comparison with a conventional technology in which the braking force is controlled so as to reduce the braking force difference, the left-right braking force difference can be increased. Thus, it is possible to generate a relatively large braking force in the vehicle.

Incidentally, the "split road" means a road in which the friction coefficient of the road surface in contact with one of the left and right wheels of the vehicle is different from the friction coefficient of the road surface in contact with the other of the left and right wheels.

In one aspect of the vehicle control apparatus of the present invention, the controlling device controls the hydraulic pressure increasing or decreasing period changing device so as to extend the increasing or decreasing period of the hydraulic pressure corresponding to each of the wheels in contact with the road surface having the high road surface friction coefficient, in comparison with the increasing or decreasing period in the case where the left-right braking force difference is not generated, in the case where the left-right braking force difference is generated due to operation of the hydraulic pressure controlling device.

According to this aspect, it is possible to suppress the deviation in the yaw direction of the vehicle, relatively easily.

In another aspect of the vehicle control apparatus of the present invention, the controlling device controls the hydraulic pressure increasing or decreasing period changing device so as to make the increasing or decreasing period of the hydraulic pressure corresponding to each of the wheels in contact with the road surface having the high road surface friction coefficient different from a period corresponding to a yaw resonance frequency associated with a vehicle, in the case where the left-right braking force difference is generated due to operation of the hydraulic pressure controlling device.

According to this aspect, it is possible to suppress the deviation in the yaw direction of the vehicle, relatively easily.

In another aspect of the vehicle control apparatus of the present invention, the hydraulic pressure controlling device controls the hydraulic pressure corresponding to each of the wheels in contact with the road surface having the high road surface friction coefficient so as to reduce a fluctuation range of the hydraulic pressure corresponding to each of the wheels in contact with the road surface having the high road surface friction coefficient, in the case where the left-right braking force difference is generated due to operation of the hydraulic pressure controlling device.

According to this aspect, it is possible to improve stability of the behavior of the vehicle in the braking and to reduce a stopping distance.

In another aspect of the vehicle control apparatus of the present invention, the hydraulic pressure increasing or decreasing period changing device changes the increasing or decreasing period of the hydraulic pressure by changing one of a reduced-pressure standard, a reduced-pressure amount, and an increased-pressure gradient associated with the hydraulic pressure controlling device.

According to this aspect, it is possible to change the increasing or decreasing period of the hydraulic pressure, relatively easily.

In another aspect of the vehicle control apparatus of the present invention, the controlling device controls the hydraulic pressure increasing or decreasing period changing device so as to change the increasing or decreasing period of the hydraulic pressure of a rear wheel in contact with the road surface having the high road surface friction coefficient, from that in the case where the left-right braking force difference is not generated, in the case where the left-right braking force difference is generated due to operation of the hydraulic pressure controlling device.

According to this aspect, even if a road on which the vehicle is driving is changed, for example, from the split road to a road surface which is not the split road and which has a relatively high friction coefficient (e.g. an asphalt pavement, a concrete pavement, etc.), it is possible to ensure the stability of the behavior of the vehicle on the split road while ensuring responsiveness of the vehicle in changing the road surface.

In another aspect of the vehicle control apparatus of the present invention, it is further provided with an assist torque applying device capable of applying an assist torque for assisting a steering force, which promotes steering of steered wheels out of the wheels, independently to the steered wheels on either side, the controlling device correcting the assist torque applied to at least one of the steered wheels by the assist torque applying device, in accordance with a fluctuation of the hydraulic pressure corresponding to each of the wheels in contact with the road surface having the high road surface friction coefficient, in the case where the left-right braking force difference is generated due to operation of the hydraulic pressure controlling device.

According to this aspect, it is possible to suppress a change in a steering reaction force due to the variation of the hydraulic pressure of the braking force applying device. As a result, it is possible to suppress a driver's uncomfortable feeling, which is extremely useful in practice.

In an aspect in which the assist torque applying device is provided, the controlling device may control the assist torque applying device so as to apply the assist torque to one of the steered wheels in contact with a road surface having a low road surface friction coefficient, in reducing the hydraulic pressure corresponding to each of the wheels in contact with the road surface having the high road surface friction coefficient, in the case where the left-right braking force difference is generated due to operation of the hydraulic pressure controlling device.

By virtue of such a configuration, it is possible to suppress the change in the steering reaction force due to the variation of the hydraulic pressure of the braking force applying device, relatively easily.

In an aspect in which the assist torque applying device is provided, the controlling device may apply damping to a steering reaction force in accordance with the increasing or decreasing period of the hydraulic pressure corresponding to each of the wheels in contact with the road surface having the high road surface friction coefficient, in reducing the hydraulic pressure corresponding to each of the wheels in contact with the road surface having the high road surface friction coefficient, in the case where the left-right braking force difference is generated due to operation of said hydraulic pressure controlling device.

By virtue of such a configuration, it is possible to suppress the change in the steering reaction force due to the variation of the hydraulic pressure of the braking force applying device, relatively easily. Incidentally, the expression "apply damping to the steering reaction force" means reducing (i.e. damping) the assist torque applied to at least one of the steered wheels.

The operation and other advantages of the present invention will become more apparent from an embodiment explained below.

MODE FOR CARRYING OUT THE INVENTION

Hereinafter, an embodiment of the vehicle control apparatus of the present invention will be explained with reference to the drawings.

(Configuration of Vehicle)

Figure 1:
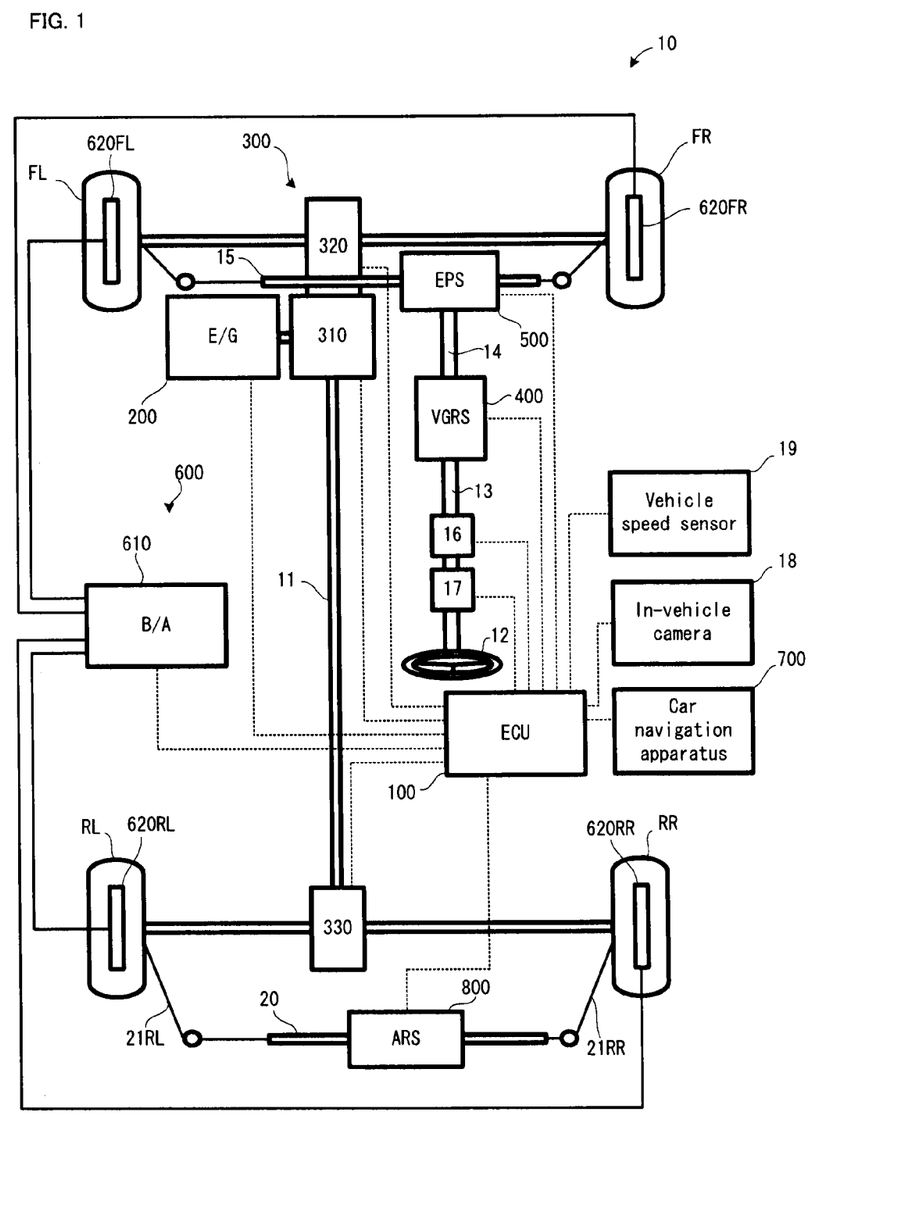
FIG. 1 is a block diagram showing a configuration of a vehicle in which a vehicle control apparatus in an embodiment of the present invention is installed.

Firstly, a configuration of a vehicle in the embodiment of the present invention will be explained with reference to FIG. 1. FIG. 1 is a block diagram showing the configuration of the vehicle in which a vehicle control apparatus in the embodiment of the present invention is installed. Incidentally, in FIG. 1, only members directly related to the embodiment are shown and the illustration of other members is omitted.

In FIG. 1, a vehicle 10 is provided with wheels, which are a left front wheel FL, a right front wheel FR, a left rear wheel RL, and a right rear wheel RR. The vehicle 10 is configured to move in a desired direction by a rudder angle change of the left front wheel FL and the right front wheel FR, which are steered wheels out of the wheels, and by a rudder angle change of the left rear wheel FL and the right rear wheel FR.

The vehicle 10 is provided with an electronic control unit (ECU) 100, an engine 200, a driving force distributing apparatus 300, a VGRS actuator 400, an EPS actuator 500, an ECB 600, a car navigation apparatus 700, and an ARS actuator 800.

The ECU 100 is provided with a central processing unit (CPU), a read only memory (ROM), and a random access memory (RAM), each of which is not illustrated, and it is an electronic control unit capable of controlling all the operations of the vehicle 10.

The engine 200 is a power source for the vehicle 10. A crankshaft, which is a shaft for outputting a driving force of the engine 200, is connected to a center differential apparatus 310 as one constituent of the driving force distributing apparatus. Incidentally, since the detailed configuration of the engine 200 correlates weakly with the subject of the present invention, the details will be omitted herein.

The driving force distributing apparatus 300 can distribute an engine torque transmitted through the aforementioned crankshaft from the engine 200, to the front wheels and the rear wheels at a predetermined ratio. The driving force distributing apparatus 300 is provided with the center differential apparatus 310 (hereinafter referred to as a "center differential 310" as occasion demands), a front differential apparatus 320 (hereinafter referred to as a "front differential 320" as occasion demands), and a rear differential apparatus 330 (hereinafter referred to as a "rear differential 330" as occasion demands).

The center differential 310 is a limited slip differential (LSD: a differential mechanism with a differential limiting function) for distributing the engine torque supplied from the engine 200, to the front differential 320 and the rear differential 330.

The center differential 310 distributes the engine torque to the front and rear wheels at a distribution ratio of (as one example but not limited to) 50:50 under the condition that a load acting on the front and rear wheels is substantially constant. Moreover, if a rotational speed of either one of the front and rear wheels is higher than that of the other, differential limit is performed such that a differential limiting torque acts on the one wheels and the torque is transferred to the other wheels. In other words, the center differential 310 is a so-called rotational-speed-sensing (viscous coupling) differential mechanism.

Incidentally, the center differential 310 is not limited to such a rotational-speed-sensing differential mechanism, but may be a torque-sensing differential mechanism in which a differential limiting action increases in proportion to an input torque. Moreover, it may be a distribution-ratio-variable differential mechanism in which a differential action is exerted by a planetary gear mechanism, in which the differential limiting torque is continuously changed by on-off control of an electromagnetic clutch, and in which a desired distribution ratio can be realized within a predetermined adjustable range. In any case, the center differential 310 may adopt various practical aspects regardless of being publicly known or unknown, as long as it can distribute the engine torque to the front wheels and the rear wheels.

The front differential 320 is a distribution-ratio-variable LSD capable of distributing the engine torque distributed to the side of a front axle (front wheel axle) by the center differential 310, further to the left and right wheels at a desired distribution ratio set within a predetermined adjustable range.

The front differential 320 is provided with: a planetary gear mechanism including a ring gear, a sun gear, and a pinion carrier; and an electromagnetic clutch for providing a differential limiting torque. With the ring gear of the planetary gear mechanism, a differential case is coupled. With the sun gear and the carrier, the axle is coupled on either side. Moreover, the differential limiting torque is continuously controlled by electrification control for the electromagnetic clutch, and the distribution ratio of the torque is continuously variably controlled within a predetermined adjustable range which is determined in terms of physical and electrical configurations of the front differential 320.

The front differential 320 is electrically connected to the ECU 100, and the electrification control for the electromagnetic clutch is also controlled by the ECU 100. Therefore, the ECU 100 can generate a desired front wheel left-right driving force difference through drive control of the front differential 320.

Incidentally, the configuration of the front differential 320 is not limited to what is exemplified herein, but can have various aspects regardless of being publicly known or unknown, as long as it can distribute a driving force (incidentally, the torque and the driving force have a unique or unambiguous relation) to the left and right wheels at a desired distribution ratio. In any case, such a left-right driving force distributing action is publicly known, and its details are not mentioned herein to prevent a complicated explanation.

The rear differential 330 is a distribution-ratio-variable LSD capable of distributing the engine torque distributed to the side of a rear axle (rear wheel axle) through a propeller shaft 11 by the center differential 310, further to the left and right wheels at a desired distribution ratio set within a predetermined adjustable range.

The rear differential 330 is provided with: a planetary gear mechanism including a ring gear, a sun gear, and a pinion carrier; and an electromagnetic clutch for providing a differential limiting torque. With the ring gear of the planetary gear mechanism, a differential case is coupled. With the sun gear and the carrier, the axle is coupled on either side. Moreover, the differential limiting torque is continuously controlled by electrification control for the electromagnetic clutch, and the distribution ratio of the torque is continuously variably controlled within a predetermined adjustable range which is determined in terms of physical and electrical configurations of the rear differential 330.

The rear differential 330 is electrically connected to the ECU 100, and the electrification control for the electromagnetic clutch is also controlled by the ECU 100. Therefore, the ECU 100 can generate a desired rear wheel left-right driving force difference through drive control of the rear differential 320.

Incidentally, the configuration of the rear differential 330 is not limited to what is exemplified herein, but can have various aspects regardless of being publicly known or unknown, as long as it can distribute a driving force (incidentally, the torque and the driving force have a unique or unambiguous relation) to the left and right wheels at a desired distribution ratio. In any case, such a left-right driving force distributing action is publicly known, and its details are not mentioned herein to prevent a complicated explanation.

The VGRS actuator 400 is a steering transmission ratio varying apparatus, provided with a housing, a VGRS motor, a reduction gear mechanism, and a locking mechanism (all of which are not illustrated).

In the VGRS actuator 400, the VGRS motor, the reduction gear mechanism and the locking mechanism are accommodated in the housing. The housing is fixed to an end on the downstream side of an upper steering shaft 13 coupled with a steering wheel 12 as a steering input device, and the housing can rotate substantially integrally with the upper steering shaft 13.

The VGRS motor is a DC brushless motor having a rotor as a rotator, a stator as a stationary part, and a rotating shaft as a shaft for outputting a driving force. The stator is fixed to the inside of the housing, and the rotor is rotatably held within the housing. The rotating shaft is coaxially rotatably fixed to the rotor and is coupled with the reduction gear mechanism at an end on the downstream side. To the stator, a drive voltage is supplied from a not-illustrated electric drive circuit.

The reduction gear mechanism is a planetary gear mechanism having a plurality of rotational elements which can perform differential rotation. One of the plurality of rotational element is coupled with the rotating shaft of the VGRS motor, and one of the other rotational elements is coupled with the aforementioned housing. Then, the remaining rotational element is coupled with a lower steering shaft 14.

In the reduction gear mechanism having such a configuration, a rotational speed of the upper steering shaft 13 according to the operation amount of the steering wheel 12 (i.e. a rotational speed of the housing) and a rotational speed of the VGRS motor (i.e. a rotational speed of the rotating shaft) uniquely determine a rotational speed of the lower steering shaft 14 coupled with the remaining one rotational element.

At this time, it is possible to control an increase and a reduction in the rotational speed of the lower steering shaft 14 by controlling an increase and a reduction in the rotational speed of the VGRS motor by means of the differential action between the rotational elements. In other words, the upper steering shaft 13 and the lower steering shaft 14 can relatively rotate by the action of the VGRS motor and the reduction gear mechanism.

Incidentally, in terms of the configuration of each rotational element in the reduction gear mechanism, the rotational speed of the VGRS motor is transmitted to the lower steering shaft 14 in the state that it is reduced in accordance with a predetermined reduction ratio which is determined in accordance with a gear ratio between the rotational elements.

As described above, in the vehicle 10, since the upper steering shaft 13 and the lower steering shaft 14 can relatively rotate, a steering transmission ratio is continuously variable in a range set in advance, wherein the steering transmission ratio is a ratio between a steering angle as a rotation angle of the upper steering shaft 13 and a rudder angle of the front wheels as the steered wheels, which is uniquely determined according to the rotation amount of the lower steering shaft 14 (which is also related to a gear ratio of a rack and pinion mechanism described later).

Incidentally, the locking mechanism is a clutch mechanism provided with a clutch element on the VGRS motor side and a clutch element on the housing side. In the condition that both the clutch elements engage with each other, the rotational speed of the upper steering shaft 13 matches the rotational speed of the rotating shaft of the VGRS motor. Thus, inevitably, the rotational speed of the lower steering shaft 14 also matches them. In other words, the upper steering shaft 13 and the lower steering shaft 14 are directly connected. The details of the locking mechanism correlate weakly with the embodiment, and thus, the details are omitted herein.

Incidentally, the VGRS actuator 400 is electrically connected to the ECU 100, and the operations thereof are controlled by the ECU 100.

In the vehicle 10, the rotation of the lower steering shaft 14 is transmitted to the rack and pinion mechanism. The rack and pinion mechanism is a steering transmission mechanism including: a not-illustrated pinion gear connected to the lower steering shaft 14 at the end on the downstream side; and a rack bar 15 in which gear teeth engaging with the gear teeth of the pinion gear are formed. The rotation of the pinion gear is converted into a motion in a horizontal direction in FIG. 1 of the rack bar 15, by which a steering force is transmitted to each steered wheel via a tie rod and a knuckle (whose reference numerals are omitted) coupled with both ends of the rack bar 15.

The EPS actuator 500 is one example of the "assist torque applying device" of the present invention. The EPS actuator 500 is a steering torque assisting apparatus, provided with an EPS motor as a DC brushless motor including: a not-illustrated rotor as a rotator to which a permanent magnet is attached; and a stator as a stationary part which surrounds the rotor.

The EPS motor can generate an EPS torque in a direction of rotation of the rotor, which is rotated by the action of a rotating magnetic field formed in the EPS motor due to the electrification to the stator via a not-illustrated electric driving apparatus.

On the other hand, a not-illustrated reduction gear is fixed to a motor shaft as a rotating shaft of the EPS motor, and this reduction gear also directly or indirectly engages with a reduction gear disposed on the lower steering shaft 14. Thus, in the embodiment, the EPS torque generated from the EPS motor functions as a torque for assisting the rotation of the lower steering shaft 14. Thus, if the EPS torque is applied in the same direction of a driver steering torque applied to the upper steering shaft 13 via the steering wheel 12, a driver's steering load is reduced by the amount of the EPS torque.

Incidentally, the EPS actuator 500 is a so-called electronically-controlled power steering apparatus for assisting the driver steering torque by using the torque of the motor which is electrically connected to the ECU 100 and whose operations are controlled by the ECU 100. However, a power steering apparatus provided for the vehicle 10 may be a so-called hydraulic power steering apparatus for reducing the driver's steering load by using a hydraulic driving force applied via a hydraulic driving apparatus.

The vehicle 10 is provided with a steering angle sensor 16 and a steering torque sensor 17. The steering angle sensor 16 is an angle sensor capable of detecting the steering angle which indicates the rotation amount of the upper steering shaft 13. The steering angle sensor 16 is electrically connected to the ECU 100, and the detected steering angle is referred to by the ECU 100 with a regular or irregular period.

The steering torque sensor 17 is a sensor capable of detecting the driver steering torque applied via the steering wheel 12 from a driver. Explaining it more specifically, the upper steering shaft 13 has such a configuration that it is divided into an upstream part and a downstream part and that the parts are mutually coupled by using a not-illustrated torsion bar. To the both ends on the upstream side and the downstream side of the torsion bar, rings for detecting a rotational phase difference are fixed.

The torsion bar is twisted in its rotational direction in accordance with the steering torque (i.e. the driver steering torque) transmitted through the upstream part of the upper steering shaft 13 when the driver of the vehicle 10 operates the steering wheel 12, and the torsion bar can transmit the steering torque to the downstream part while generating the twist. Therefore, upon the transmission of the steering torque, there is the rotational phase difference between the rings for detecting the rotational phase difference described above.

The steering torque sensor 17 can detect the rotational phase difference, convert the rotational phase difference to the steering torque, and output it as an electrical signal corresponding to the driver steering torque. The steering torque sensor 17 is electrically connected to the ECU 100, and the detected driver steering torque is referred to by the ECU 100 with a regular or irregular period.

Incidentally, a method of detecting the steering torque is not limited to this type of torsion bar method, but may adopt another method.

The ECB 600 is an electronically-controlled braking apparatus capable of applying a braking force individually to each of the left and right front and rear wheels of the vehicle 10. The ECB 600 is provided with: a brake actuator 610; and braking apparatuses 620FL, 620FR, 620RL, and 620RR corresponding to the left front wheel FL, the right front wheel FR, the left rear wheel RL and the right rear wheel RR, respectively.

The brake actuator 610 is a hydraulic control actuator configured to supply hydraulic oil individually to each of the braking apparatuses 620FL, 620FR, 620RL, and 620RR. The brake actuator 610 is provided with a master cylinder, an electric oil pump, a plurality of hydraulic transmission paths, an electromagnetic valve disposed in each of the hydraulic transmission paths, and the like, and it can control the opening/closing state of the electromagnetic valve, thereby controlling the hydraulic pressure of the hydraulic oil supplied to a wheel cylinder provided for each braking apparatus, individually in each braking apparatus. The hydraulic pressure of the hydraulic oil has a one-on-one relation with the pressing force of a braking pad provided for each braking apparatus, and the high and low hydraulic pressures of the hydraulic oil correspond to the large and small braking forces of each braking apparatus, respectively.

The brake actuator 610 is electrically connected to the ECU 100, and the braking force applied to each wheel from respective one of the braking apparatuses is controlled by the ECU 100. Incidentally, the "braking apparatuses 620FL, 620FR, 620RL, and 620RR" and the "brake actuator 610" in the embodiment are one example of the "braking force applying device" of the present invention.

The vehicle 10 is provided with an in-vehicle camera 18 and a vehicle speed sensor 19. The in-vehicle camera 18 is an imaging apparatus which is disposed on a front nose of the vehicle 10 and which can image a predetermined area ahead of the vehicle 10. The in-vehicle camera 18 is electrically connected to the ECU 100, and the imaged area ahead is sent out to the ECU 100 as image data with a regular or irregular period.

The ECU 100 can analyze the image data and obtain various data necessary for, for example, lane keeping assist (LKA) (steeling assistance for lane keeping driving) control. Incidentally, since various known aspects can be applied to the LKA, the details of the LKA are not mentioned here to prevent a complicated explanation.

The vehicle speed sensor 19 is a sensor capable of detecting a vehicle speed as the speed or velocity of the vehicle 10. The vehicle speed sensor 19 is electrically connected to the ECU 100, and the detected vehicle speed is referred to by the ECU 100 with a regular or irregular period.

The car navigation apparatus 700 is an apparatus capable of providing various navigation information, including information about a position of the vehicle 10, information about a road around the vehicle 10 (a road type, a road width, the number of lanes, a speed limit, a road shape, etc.), traffic light information, information about various facilities located around the vehicle 10, traffic congestion information, environmental information, and the like, on the basis of signals obtained via a GPS antenna and a VICS antenna disposed in the vehicle 10. The car navigation apparatus 700 is electrically connected to the ECU 100, and the operation state thereof is controlled by the ECU 100.

The ARS actuator 800 is a rear wheel steering actuator capable of changing a rear wheel rudder angle, which is a rudder angle of the left rear wheel RL and the right rear wheel RR, independently of a steering input given by the driver via the steering wheel 12.

The ARS actuator 800 contains an ARS motor and a reduction gear mechanism, and a drive circuit of the ARS motor is electrically connected to the ECU 100. Therefore, the ECU 100 can control an ARS torque, which is an output torque of the ARS motor, by controlling the drive circuit.

On the other hand, the reduction gear can transmit the torque of the ARS motor to a rear steering rod 20 with deceleration.

The rear steering rod 20 is coupled with the left rear wheels RL and the right rear wheel RR via joint members 21RL and 21RR, respectively. If the rear steering rod 20 is driven by the ARS torque in a horizontal one direction illustrated, each of the rear wheels is steered in one direction.

Incidentally, the ARS actuator 800 may be provided with a direct acting mechanism capable of converting a rotary motion into a stroke motion. If this type of direct acting mechanism is provided, the rear steering rod 20 may change the rudder angle of the rear wheels in accordance with the stroke motion in the horizontal direction of this direct acting mechanism.

Incidentally, the practical aspect of the rear wheel steering apparatus is not limited to that of the ARS actuator 800 illustrated, as long as it can make the rear wheel rudder angle variable in a predetermined range.

Incidentally, the vehicle 10 in the embodiment can control the rudder angles of the front and rear wheels independently of the steering input from the driver's side by using the VRGS actuator 400 and the ARS actuator 800; however, the vehicle of the present invention is not limited to such a vehicle configuration. For example, the vehicle of the present invention may have such a vehicle configuration that there is no VRGS actuator 400 in terms of the vehicle 10, i.e. a vehicle configuration allowing active control only of the rear wheel rudder angle, or such a configuration that there is no ARS actuator 800, i.e. a vehicle configuration allowing active control only of the front wheel rudder angle.

(Vehicle Control Apparatus)

The ECU 100 as a part of the vehicle control apparatus installed in the vehicle 10 configured as described above controls the hydraulic pressure of the hydraulic oil supplied to each of the braking apparatuses 620FL, 620FR, 620RL, and 620RR by using the brake actuator 610 such that each of the left front wheel FL, the right front wheel FR, the left rear wheel RL, and the right rear wheel RR is not locked if the braking force is generated in the vehicle by the driver of the vehicle 10 pressing a brake pedal (not illustrated).

The ECU 100 monitors the rotation of each of the left front wheel FL, the right front wheel FR, the left rear wheel RL, and the right rear wheel RR by using a rotation sensor or the like not illustrated here. (i) If the rotation of one wheel out of the front wheel FL, the right front wheel FR, the left rear wheel RL, and the right rear wheel RR exceeds a deceleration threshold value set in advance, the ECU 100 controls the brake actuator 610 to reduce the hydraulic pressure of the hydraulic oil supplied to the braking apparatuses corresponding to the one wheel such that the one wheel is not locked. Moreover, (ii) the ECU 100 calculates deceleration of the one wheel on the basis of an output from the rotation sensor after a predetermined period determined by a clock frequency associated with the ECU 100 and controls the brake actuator 610 to change (typically, increase) the hydraulic pressure of the hydraulic oil supplied to the braking apparatus corresponding to the one wheel in accordance with the calculated deceleration. The ECU 100 repeats the controls of (i) and (ii) described above. As described above, since the hydraulic pressure of the hydraulic oil supplied to each of the braking apparatuses corresponding to respective one of the wheels is controlled by the ECU 100, the hydraulic pressure repeatedly increases and decreases, periodically (refer to FIG. 2).

The ECU 100 as a part of the vehicle control apparatus can further change an increasing or decreasing period of the hydraulic pressure of the hydraulic oil supplied to each of the braking apparatuses 620FL, 620FR, 620RL, and 620RR. Specifically, the ECU 100 changes the increasing or decreasing period of the hydraulic pressure, for example, (i) by changing a reduced-pressure standard (refer to "P1" in FIG. 2(*a*) and "P2" in FIG. 2(*b*)), (ii) by changing a reduced-pressure amount (refer to "ΔP" in FIG. 2(*b*)), or (iii) by changing an increased-pressure gradient, or the like.

Figure 2:
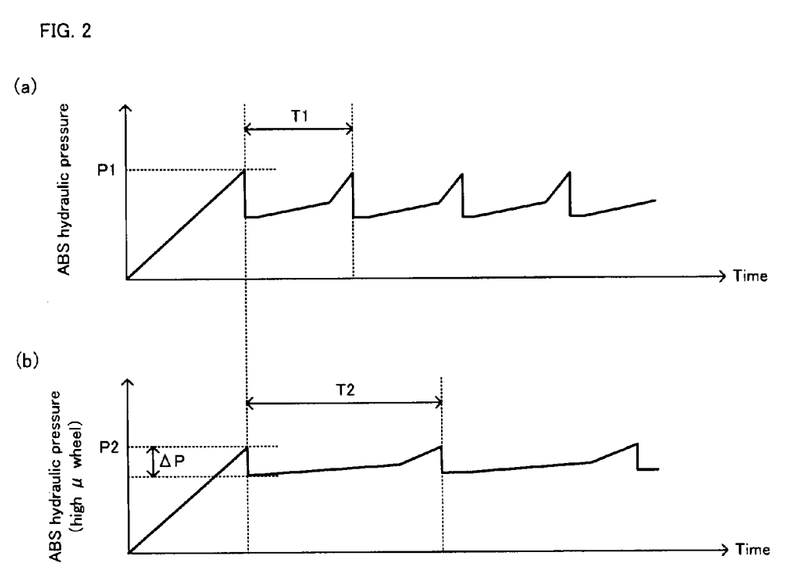
FIG. 2 are views showing one example of temporal variation of a hydraulic pressure supplied to braking apparatus.

Incidentally, FIG. 2 are views showing one example of temporal variation of the hydraulic pressure supplied to the braking apparatus. FIG. 2(*a*) shows one example of the temporal variation of the hydraulic pressure in the normal case, and FIG. 2(*b*) shows one example of the temporal variation of the hydraulic pressure supplied to a braking apparatus corresponding to a wheel in contact with a high μ road if a left-right braking force difference is generated as described later.

Figure 3:
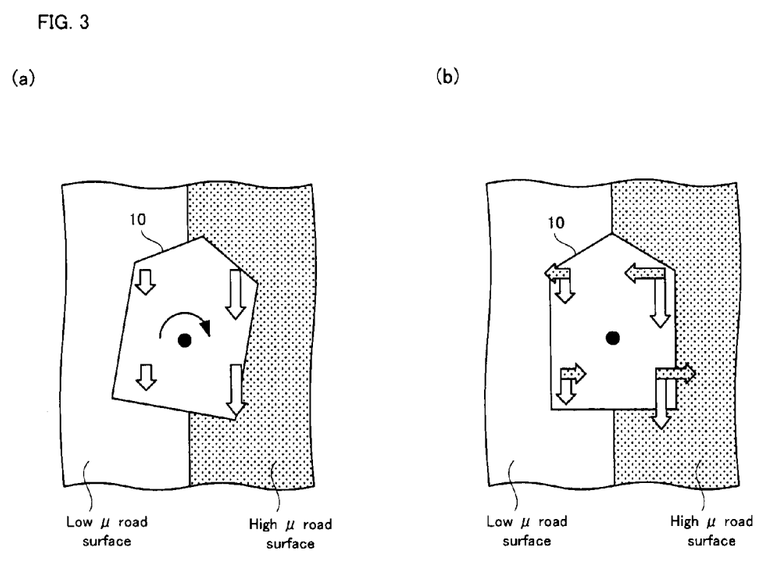
FIG. 3 are conceptual views showing one example of a braking force and the like generated in the vehicle.

When the vehicle 10 is driving on a split road, if the hydraulic pressure of the hydraulic oil supplied to each of the braking apparatuses 620FL, 620FR, 620RL, and 620RR is controlled by the ECU 100 such that each of the front wheel FL, the right front wheel FR, the left rear wheel RL, and the right rear wheel RR is not locked, the braking force generated in each of the wheels in contact with a low μ road of the split road become less than the driving force generated in each of the wheels in contact with the high μ road of the split road, and thus, the left-right braking force difference is generated (refer to FIG. 3(*a*)).

In this case, yaw moment is generated in the vehicle 10 due to the generated left-right braking force difference. Thus, the ECU 100 as a part of the vehicle control apparatus controls each of the VGRS actuator 400 and the ARS actuator 800 to suppress the generated yaw moment, by controlling the rudder angle of each of the front wheel FL, the right front wheel FR, the left rear wheel RL, and the right rear wheel RR (refer to FIG. 3(*a*)).

Here, according to a study by the present inventors, the following matter is found; namely, there is such a characteristic that a motion in a yaw direction of the vehicle 10 due to the yaw moment amplifies oscillation of a particular frequency (i.e. yaw resonance frequency), essentially as a mechanical system. Thus, even a slight force applied to the vehicle 10 is amplified. In addition, if the braking force is appropriately ensured, the aforementioned increasing or decreasing period (refer to "T1" in FIG. 2(*a*)) of the hydraulic pressure tends to approach a period corresponding to the yaw resonance frequency (i.e. the reciprocal of the yaw resonance frequency). Then, in order to suppress the yaw moment generated due to the left-right braking force difference, if the VGRS actuator 400 and the ARS actuator 800 are controlled, the yaw moment is amplified transitionally due to the yaw resonance frequency and the increasing or decreasing period of the hydraulic pressure, and behavior of the vehicle 10 likely becomes unstable (refer to FIG. 4).

Thus, the ECU 100 as a part of the vehicle control apparatus particularly extends the increasing or decreasing period (refer to "T2" in FIG. 2(*b*)) of the hydraulic pressure of the hydraulic oil supplied to each of the braking apparatuses corresponding to respective one of the wheels (here, the right front wheel FR and the right rear wheel RR) in contact with the high μ road of the split road if the left-right braking force difference is generated, beyond the increasing or decreasing period in the normal case where there is no left-right braking force difference (i.e. if the vehicle 10 is driving on a general road such as an asphalt pavement), in order to make it different from the period corresponding to the yaw resonance frequency.

As a result, according to the vehicle control apparatus, it is possible to ensure stability of the behavior of the vehicle 10 by suppressing the oscillation in the yaw direction associated with the change in the hydraulic pressure of the hydraulic oil supplied to each of the braking apparatuses corresponding to respective one of the wheels such that the respective one wheel is not locked.

The "ECU 100" in the embodiment is one example of the "hydraulic pressure controlling device", the "hydraulic pressure increasing or decreasing period changing device", and the "controlling device" of the present invention. In the embodiment, one portion of the functions of the ECU 100 for various electronic controls of the vehicle 10 is used as a part of the vehicle control apparatus.

Figure 4:
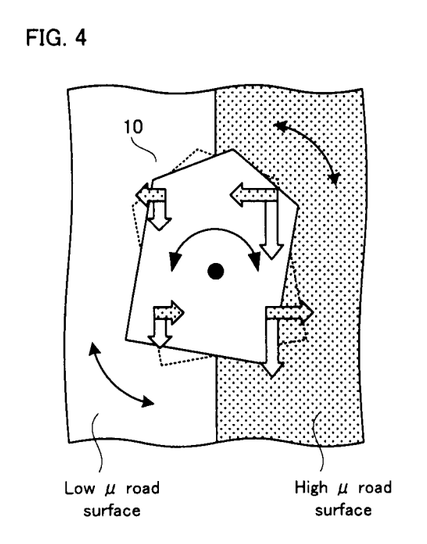
FIG. 4 is a conceptual view showing one example of vehicle behavior if yaw moment is amplified.

Incidentally, FIG. 3 are conceptual views showing one example of the braking force and the like generated in the vehicle. FIG. 4 is a conceptual view showing one example of the vehicle behavior if the yaw moment is amplified.

By the way, as described above, in order to suppress the yaw moment generated due to the left-right braking force difference, if the VGRS actuator 400 and the ARS actuator 800 are controlled, a steering reaction force is changed due to the change in the rudder angle of each of the left front wheel FL and the right front wheel FR and the driver of the vehicle 10 likely feels uncomfortable, which is found by the study by the present inventors.

Thus, the ECU 100 as a part of the vehicle control apparatus controls the EPS actuator 500 to suppress the variation of the steering reaction force when controlling the VGRS actuator 400 and the ARS actuator 800 in order to suppress the yaw moment generated due to the left-right braking force difference.

Specifically, the ECU 100 controls the EPS actuator 500 to apply the EPS torque as one specific example of the "assist torque" of the present invention, in a stepwise manner to the side of the front wheel (here, the left front wheel FL) in contact with the low μ road in timing of reducing the hydraulic pressure of the hydraulic oil supplied to the braking apparatus (here, the braking apparatus FR) corresponding to the front wheel (here, the right front wheel FR) in contact with the high μ road.

At this time, the ECU 100 applies a damping force to the steering reaction force in accordance with the increasing or decreasing period of the hydraulic pressure of the hydraulic oil supplied to the braking apparatus corresponding to the front wheel in contact with the high μ road. More specifically, the ECU 100 applies the damping force to the steering reaction force, for example, by adding a damping term to an arithmetic expression for calculating the EPS torque or performing similar actions. Incidentally, the damping force is determined in accordance with a steering angle of the wheel to which the damping force is to be applied.

Incidentally, in a period in which the left-right braking force difference is generated, if a road on which the vehicle 10 is driving is changed from the split road to a general road, the ECU 100 (i) may control the VGRS actuator 400 and the ARS actuator 800 to suppress the yaw moment generated due to the left-right braking force difference and (ii) may control change only the increasing or decreasing period of the hydraulic pressure of the hydraulic oil supplied to the braking apparatus corresponding to the rear wheel in contact with the high μ road.

The present invention is not limited to the aforementioned embodiments, but various changes may be made, if desired, without departing from the essence or spirit of the invention which can be read from the claims and the entire specification. A vehicle control apparatus, which involves such changes, is also intended to be within the technical scope of the present invention.

DESCRIPTION OF REFERENCE CODES

FL, FR, RL, RR wheel
10 vehicle
11 propeller shaft
12 steering wheel
13 upper steering shaft
14 lower steering shaft
15 rack bar
16 steering angle sensor
17 steering torque sensor
100 ECU
200 engine
300 driving force distributing apparatus
310 center differential mechanism
320 front differential mechanism
330 rear differential mechanism
400 VGRS actuator
500 EPS actuator
600 ECB
610 brake actuator
620FL, 620FR, 620RL, 620RR braking apparatus
800 ARS actuator

The invention claimed is:

1. A vehicle control apparatus comprising:
a braking force applying device of a hydraulic type, capable of applying a braking force to each of a plurality of wheels;
a hydraulic pressure controlling device capable of controlling a hydraulic pressure of said braking force applying device such that each of the wheels is not locked;
a hydraulic pressure increasing or decreasing period changing device capable of changing an increasing or decreasing period of the hydraulic pressure controlled by said hydraulic pressure controlling device; and
a controlling device for controlling said hydraulic pressure increasing or decreasing period changing device so as to make the increasing or decreasing period of the hydraulic pressure corresponding to each of the wheels in contact with a road surface having a high road surface friction coefficient different from a period corresponding to a yaw resonance frequency associated with a vehicle, in a case where a left-right braking force difference is generated due to operation of said hydraulic pressure controlling device.

2. The vehicle control apparatus according to claim 1, wherein said controlling device controls said hydraulic pressure increasing or decreasing period changing device so as to extend the increasing or decreasing period of the hydraulic pressure corresponding to each of the wheels in contact with the road surface having the high road surface friction coefficient, in comparison with the increasing or decreasing period in the case where the left-right braking force difference is not generated, in the case where the left-right braking force difference is generated due to operation of said hydraulic pressure controlling device.

3. The vehicle control apparatus according to claim 1, wherein said hydraulic pressure controlling device controls the hydraulic pressure corresponding to each of the wheels in contact with the road surface having the high road surface friction coefficient so as to reduce a fluctuation range of the hydraulic pressure corresponding to each of the wheels in contact with the road surface having the high road surface friction coefficient, in the case where the left-right braking force difference is generated due to operation of said hydraulic pressure controlling device.

4. The vehicle control apparatus according to claim 1, wherein said hydraulic pressure increasing or decreasing period changing device changes the increasing or decreasing period of the hydraulic pressure by changing one of a reduced-pressure standard, a reduced-pressure amount, and an increased-pressure gradient associated with said hydraulic pressure controlling device.

5. The vehicle control apparatus according to claim 1, wherein said controlling device controls said hydraulic pressure increasing or decreasing period changing device so as to change the increasing or decreasing period of the hydraulic pressure of a rear wheel in contact with the road surface having the high road surface friction coefficient, from that in the case where the left-right braking force difference is not generated, in the case where the left-right braking force difference is generated due to operation of said hydraulic pressure controlling device.

6. The vehicle control apparatus according to claim 1, further comprising an assist torque applying device capable of applying an assist torque for assisting a steering force, which promotes steering of steered wheels out of the wheels, independently to the steered wheels on either side, said controlling device correcting the assist torque applied to at least one of the steered wheels by said assist torque applying device, in accordance with a fluctuation of the hydraulic pressure corresponding to each of the wheels in contact with the road surface having the high road surface friction coefficient, in the case where the left-right braking force difference is generated due to operation of said hydraulic pressure controlling device.

7. The vehicle control apparatus according to claim 6, wherein said controlling device controls said assist torque applying device so as to apply the assist torque to one of the steered wheels in contact with a road surface having a low road surface friction coefficient, in reducing the hydraulic pressure corresponding to each of the wheels in contact with the road surface having the high road surface friction coefficient, in the case where the left-right braking force difference is generated due to operation of said hydraulic pressure controlling device.

8. The vehicle control apparatus according to claim 6, wherein said controlling device applies damping to a steering reaction force in accordance with the increasing or decreasing period of the hydraulic pressure corresponding to each of the wheels in contact with the road surface having the high road surface friction coefficient, in reducing the hydraulic pressure corresponding to each of the wheels in contact with the road surface having the high road surface friction coefficient, in the case where the left-right braking force difference is generated due to operation of said hydraulic pressure controlling device.

* * * * *